United States Patent
Makeev

(10) Patent No.: US 7,818,320 B2
(45) Date of Patent: Oct. 19, 2010

(54) ENHANCED SEARCH RESULTS BASED ON USER FEEDBACK RELATING TO SEARCH RESULT ABSTRACTS

(75) Inventor: Evgeniy Makeev, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 396 days.

(21) Appl. No.: 11/755,835

(22) Filed: May 31, 2007

(65) Prior Publication Data

US 2008/0301089 A1     Dec. 4, 2008

(51) Int. Cl.
G06F 7/00     (2006.01)
G06F 17/30    (2006.01)

(52) U.S. Cl. .................... 707/730; 715/206
(58) Field of Classification Search ............. 707/3, 707/5, 705, 707, 726, 728, 730, 751; 715/207, 715/206, 208; 706/48
See application file for complete search history.

(56) References Cited

U.S. PATENT DOCUMENTS

| | | | |
|---|---|---|---|
| 6,240,408 B1 * | 5/2001 | Kaufman | 707/3 |
| 6,516,312 B1 * | 2/2003 | Kraft et al. | 707/3 |
| 6,766,316 B2 * | 7/2004 | Caudill et al. | 707/3 |
| 6,832,218 B1 * | 12/2004 | Emens et al. | 707/3 |
| 7,016,889 B2 * | 3/2006 | Bazoon | 706/48 |
| 7,092,936 B1 * | 8/2006 | Alonso et al. | 707/3 |
| 7,117,199 B2 * | 10/2006 | Frank et al. | 707/3 |
| 7,574,436 B2 * | 8/2009 | Kapur et al. | 707/5 |
| 7,725,442 B2 * | 5/2010 | Lin et al. | 707/688 |
| 7,739,253 B1 * | 6/2010 | Yanovsky et al. | 707/705 |
| 2004/0024751 A1 * | 2/2004 | Petrisor et al. | 707/3 |
| 2004/0186828 A1 * | 9/2004 | Yadav et al. | 707/3 |
| 2007/0112758 A1 * | 5/2007 | Livaditis | 707/5 |
| 2007/0239680 A1 * | 10/2007 | Oztekin et al. | 707/3 |

* cited by examiner

*Primary Examiner*—Yicun Wu
*Assistant Examiner*—Pavan Mamillapalli
(74) *Attorney, Agent, or Firm*—Seth H. Ostrow; Ostrow Kaufman & Frankl LLP

(57) ABSTRACT

The present invention provides for enhanced search results in response to a search request based on a search term. The enhanced search results generate a search results page including a plurality of document identifiers including a hyperlink and an abstract, each abstract including a plurality of abstract terms. The method and apparatus, upon receipt of the search request, accesses a relevancy factor database that includes relevancy factors. The relevancy factors are determined by accessing feedback logs for search results based on the same search term, calculating a popularity factor for each of the plurality of phrases in the abstracts and user selection activity and relevancy factors are based on the popularity factors. Thereby, the method and apparatus generates the search results page with the sequence of the document identifiers based on the relevancy factors.

5 Claims, 3 Drawing Sheets

ENHANCED SEARCH RESULTS BASED ON USER FEEDBACK RELATING TO SEARCH RESULT ABSTRACTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to search result user tracking technology. More specifically, embodiments of the present invention are directed towards systems and methods for enhancing search results based on user feedback of user selection activities corresponding with the abstracts displayed on a search results page.

BACKGROUND OF THE INVENTION

Basic web-based content searching techniques are well known. Common examples are readily visible in publicly available Internet searching portals. With the organic growth of content on the Internet, searching techniques are only as good as ability to prioritize or sort document identifiers (e.g. description data, e.g. abstract, and the hyperlink). Additionally, the vast breadth of searchable content is searched by a limited number of search terms, typically relatively basic terms, thus compounding the relevance concerns when returning search results.

Existing search result generation techniques recognize and incorporate generalized relevance aspects when sorting and prioritizing search results. The sorting and prioritizing is typically a precursor operation to the generation of a search results page, where the search results page includes, among other things, hyperlinks and abstracts briefly describing the documents found in the search results. For example, a first search results page may be the first twenty-five document identifiers as sorted and prioritized by the search engine, with each hyperlink including an abstract. Various engines may use different techniques for sorting and prioritizing the content. The search results page may be one of any number of pages, either limited by the number of search results or system-limited to show only a set number of results, for example the first 500 results.

In existing techniques, the relevance score of a document is calculated solely based on attributes of the document and the query, such as term statistics, site authority, document-query similarities, etc. The term documents, as used herein, refers generally to any suitable type of content that is accessible and viewable through the Internet, including HTML-encoded documents, proprietary-encoded document (e.g. PDFs), audio and/or video files, images, etc.

Existing techniques fail to take into consideration abstracts included with the hyperlinks. The existing systems make the implied connection that a user's selection of the hyperlink relates to the underlying document, but in fact the user selection may more appropriately relate to the text of the abstract. The user may be making a hyperlink selection based on the content of the abstract indicating that the subsequent document contains the information the user is seeking.

Attempts have been made to automate text recognition and categorization as may be applied to the abstract, but these attempts have mostly failed or produce significantly poor performance. For example, one approach is a technique based on the Metadata Object Description Schema (MODS). This bibliographic schema was originally developed by the Library of Congress and has since been applied as an XML schema. Although, even using this defined schema is problematic because the schema defines relationships between various terms that may be found in an abstract, but fails to account for the underlying search term. In other words, the MODS technique may find relationships to between different terms, but this relationship is not put into any level of usable context for a search engine because it is not associated with search terms. Furthermore, the MODS technique is, at best, a schema and lacks specifics for implementation with search techniques.

As such, there exists a need for enhancing search results based on the relationship of terms in the abstracts of the document identifiers, relative to the user selection activities of the corresponding hyperlinks and also the corresponding search term used in the search result.

SUMMARY OF THE INVENTION

Generally, the present invention provides for enhanced search results in response to a search request based on a search term, where the search term may include a word or phrase used for searching. The enhanced search results generate a search results page including a plurality of document identifiers, each including a hyperlink and an abstract, each abstract including a plurality of abstract terms. The method and apparatus, upon receipt of the search request, accesses a search results database that includes relevancy factors. The relevancy factors are determined by accessing feedback logs for search results based on the same search term, calculating a popularity factor for each of the plurality of phrases in the abstracts and user selection activity and relevancy factors are based on the popularity factors. Thereby, the method and apparatus generates the search results page with the sequence of the document identifiers based on the relevancy factors. Additionally, the popularity factors may be based on specific phrases, including phrases omitting noise words or non-bidded terms, providing further enhancement to the search results page.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
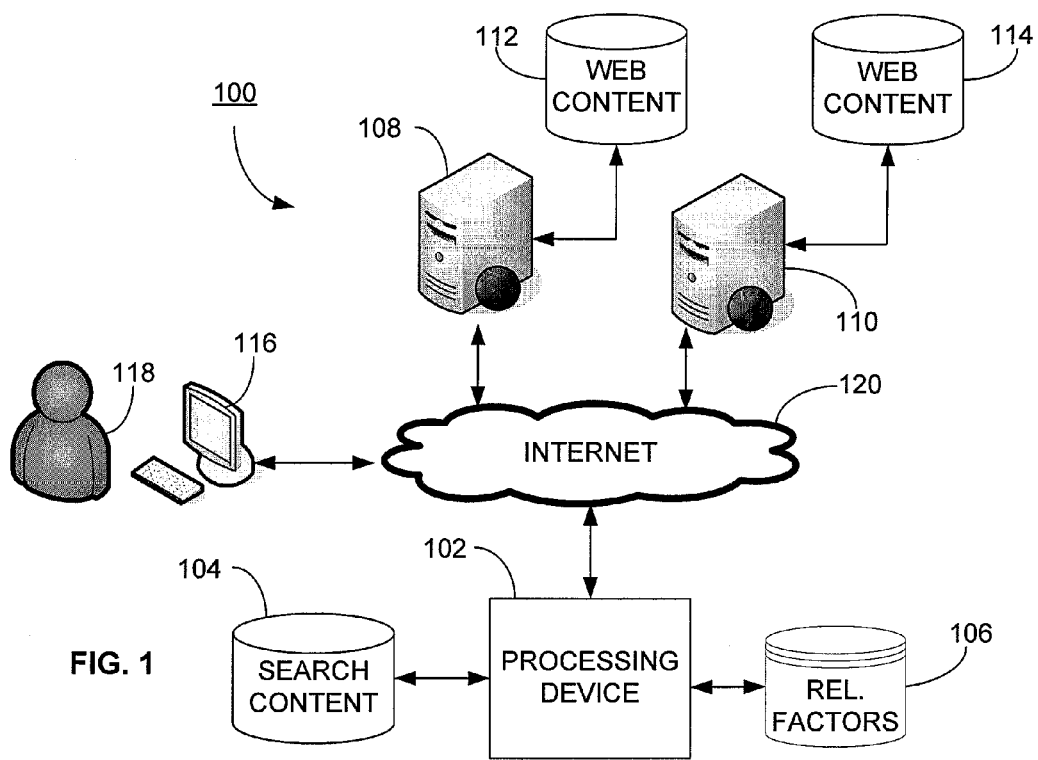
FIG. 1 illustrates a block diagram of a computing system including one embodiment of an apparatus for providing enhanced search results.

FIG. 1 illustrates a system 100 for providing enhanced search results in according with one embodiment of the present invention. The system 100 includes a processing device 102, a search content database 104 and a relevancy factor database 106.

The system 100 also includes servers 108 and 110, a given server including a Web content database, 112 and 114, respectively. The system 100 further includes a user computer 116, operated by a user 118, in communication across a network, e.g., the Internet 120.

The processing device 102 may be one or more processing elements operative to perform processing operations in response to executable instructions, collectively as a single element or as various processing modules in the embodiment described below with reference to FIG. 2. The search content database 104 and the relevancy factor database 106 may be one or more data storage devices of any suitable type, operative to store corresponding data therein. The network servers 108 and 110 may be associated with one or more Internet-accessible locations, such as websites having Internet-accessible information stored in the web content databases 112 and 114. The servers 108, 110 and content databases 112, 114 may represent well known Internet content systems whereby the user computer 116 enters a Universal Resource Locator (URL) and is directed, through routing protocols across the Internet 120, for retrieval of the web content therefrom, and subsequent display on the computing device 116. It is recognized that many elements relating to the known operations of the system 100 have been omitted for clarity purposes only.

The search engine processing device 102 is operative to receive user search requests including a search term, where the search term may include a word or phrase used for conducting the search. In the system 100, the processing device 102, upon receipt of the search request, access the relevancy factor database 106 to retrieve a plurality of relevancy factors, which are described in further detail below. Additionally, the processing device 102 accesses the search content database 104 to retrieve corresponding document identifiers for a search results page. As noted above, the document identifiers include a hyperlink to a web-linked location (such as for example either network server 108 or 110) as well as the abstract that includes abstract terms describing the particular content found at the document referenced by the hyperlink.

The processing device 102, with having the search content from the search content database 104 and the relevancy factors, is operative to generate the search results page in response to the search request. The relevancy factors indicate a corresponding relativity of the hyperlinked document to the search term, as determined in part by previous user selection activities. The relevancy factors thereby are taken into account when determining the sequence of the listing of the document identifiers on the search results page.

Once the processing device generates the search results page, this page, typically encoded in HTML, the processing device submits the page to the requesting computer 116 via the Internet 120. Whereupon, the user 118 may select one of the hyperlinks and be redirected to a corresponding to network server, such as 108, for retrieval of web content from the web content database, such as 112. In one embodiment, the processing device 102 may track the user 116 selection activities on the search results page and add this to a feedback log associated with the search term.

Figure 2:
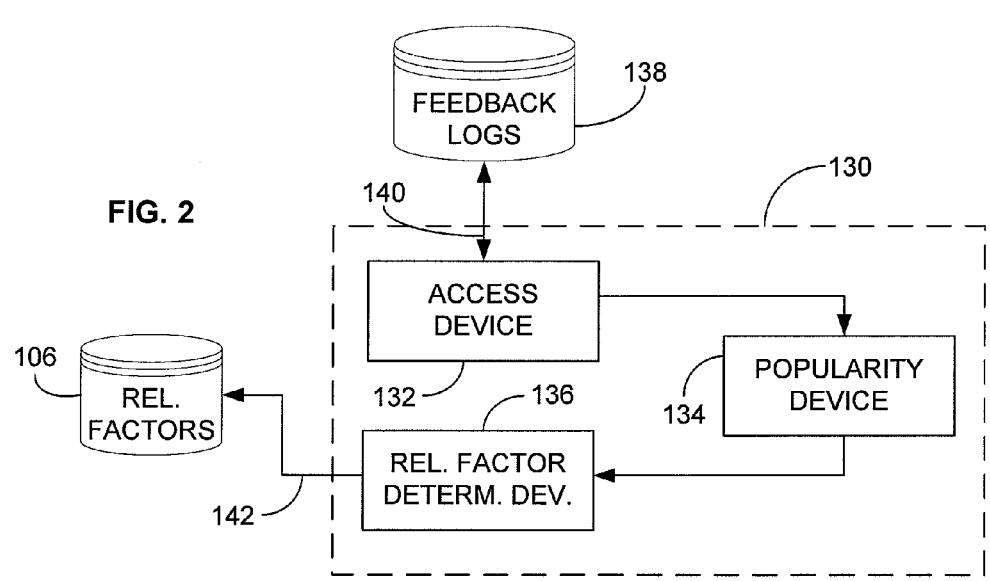
FIG. 2 illustrates a block diagram of one embodiment of a processing device operative to generate relevancy factors.

FIG. 2 illustrates one embodiment of a processing device 130 operative to populate the relevancy factor database 106 with relevancy factors. The processing device 130 includes an access device 132, a probability determination device 134 and a relevancy factor determination device 136. In addition, the processing device 130 is coupled to a feedback log database 138 having feedback logs stored therein.

The access device 132, probability device 134 and relevance factor determination device 136 may be physical processing devices or may be instructional code of executable instructions processed by one or more processing devices. The devices 132, 134 and 136 may also be within a stand-alone processing component or integrated within or across other processing systems, such as being included within the processing device 102 of FIG. 1, for example.

In the processing device 130 of FIG. 2, the access device 132 retrieves feedback logs 140 from the feedback log database 138, based on a specific search term. For example, the search term may include the term "Grand Canyon" and the feedback logs are the logs for the searches based on this term. The logs may include the various document identifiers presented to previous users when the previous user requested the search result pages and the logs also include information on which hyperlinks, if any, the previous users selected. The feedback logs 138 may include any suitable number of entries of search query sessions, where a minimum number of entries relate to the accuracy of the popularity factors computed herein.

The popularity device 134 receives the feedback logs and calculates popularity factors for each of the possible phrases in the abstracts. The phrases may be composed of one or more abstract terms. The popularity device 134 may first determine all the possible number of phrases, up to a certain length.

M is the number of words in an abstract.

L is the length of a phrase (1 . . . Lmax).

P is the number of possible phrases of L length in the query.

S is the number of possible phrases (including single words) relative to the search term.

$$P = M - (L-1) \quad \text{Equation 1:}$$

$$S = \text{SUM}(P), L=1 \ldots M = = \text{SUM}(M-x) \text{ where } x=0 \ldots L\max-1 \quad \text{Equation 2:}$$

$$S = M * L\max - L\max * (L\max - 1)/2 = L\max * (M - (L\max - 1)/2) \quad \text{Equation 3:}$$

Therefore, for Lmax=1, S=M.

For Lmax=2, S=M*2−1.

For Lmax=2, S=M*3−3.

For Lmax=4, S=M*4−6.

For Lmax=M, S=M*(M+1)/2.

An abstract consisting of M words W(i), i=0 . . . M includes M(M+1)/2 number of potential phrases P(i). As such a search term P(q) is related to P(i) number of phrases. The popularity factors may be generated based on processing the feedback log for every given search using that particular search term and finding all potential phrases that can be formed from abstracts contained in the search results page and selected by various users. For every potential abstract phrase for a given search term, the popularity device 134 calculates a popularity based on the number of abstracts containing the phrases and the frequency of user selection of associated hyperlinks for the corresponding search term.

With this popularity information, the relevancy factor determination device 136 determines relevancy factors 142 usable for enhancing the search results. For example, in one embodiment, the relevancy factors may be data indicating a predetermined number of most relevant phrases from the various abstracts. The relevancy factors 142 may then be stored in the search results database 106 and used by the processing device 102 in generating search results pages as described above. In the example of the relevancy factors 142 being most-relevant phrases, the processing device 102 in FIG. 1 may enhance search results by examining the abstracts of the document identifiers extracted from the search content database 104 and placing the document identifiers with the highest priority at the top of the search results page.

Figure 3:
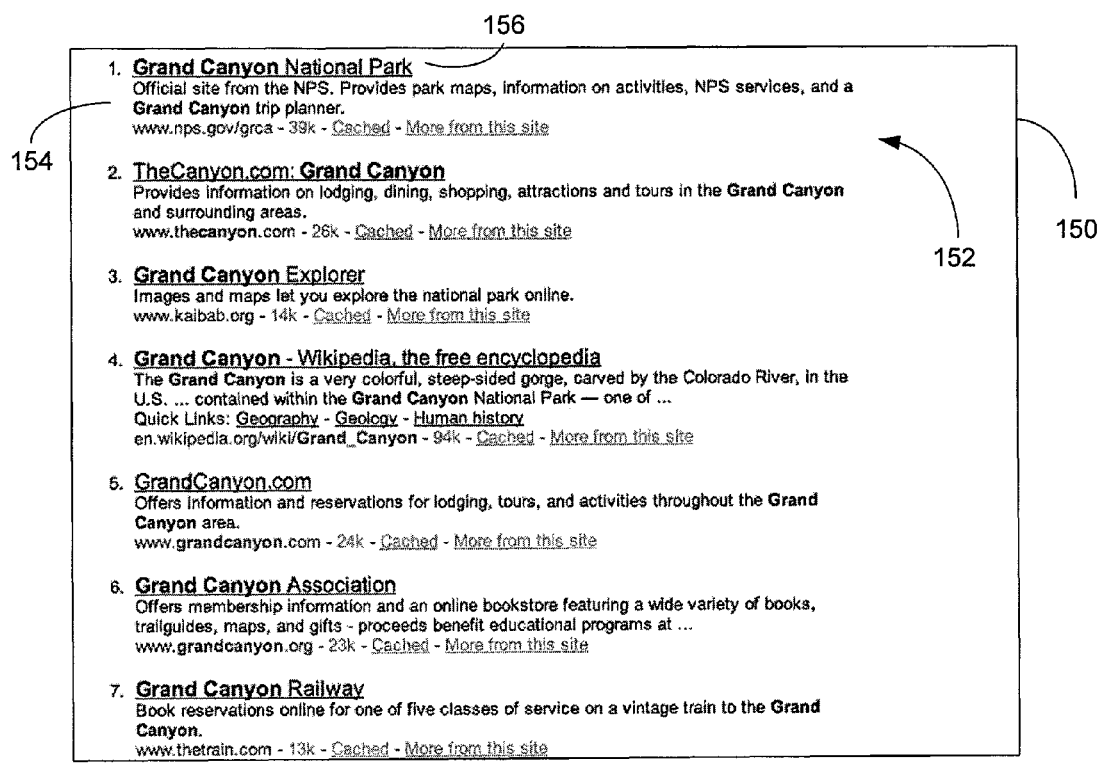
FIG. 3 illustrates a portion of a sample screen shot of an enhanced search results page.

By way of example, FIG. 3 illustrates a sample screen shot 150 of a search results page using the search term "Grand Canyon" (as indicated in bold in the abstracts). Each document identifier 152 includes an abstract 154 and a hyperlink 156. In this example, the abstract 154 of the first document identifier 152 includes the terms "Official," "site," "from," "the," "NPS," "Provides," "park," "maps," "information," "on," "activities," "NPS," "services," "and," "a," "Grand," "Canyon," "trip," "planner."

As used by the processing device 130 of FIG. 2, these terms may be in the feedback log, with an indication of the frequency of the user selection of the corresponding hyperlink 156, "www.nps.gov/grca."

The sequence of the document identifiers, here numbered 1 through 7, may be directly affected by the relevancy factors. For example, popularity factors may indicate that abstracts including the terms "map" and "tours" are the most popular. Based on this exemplary popularity factor, the corresponding relevancy factors may provide for the present sequencing of the document identifiers.

As used by the processing device 130 of FIG. 2, these terms may be in the feedback log, with an indication of the frequency of the user selection of the corresponding hyperlink 156, "www.nps.gov/grca." Thereby, the screen shot 150 may be enhanced over previous search result pages by including an enhanced sequencing of document identifiers based on contiguous abstract phrases.

Figure 4:
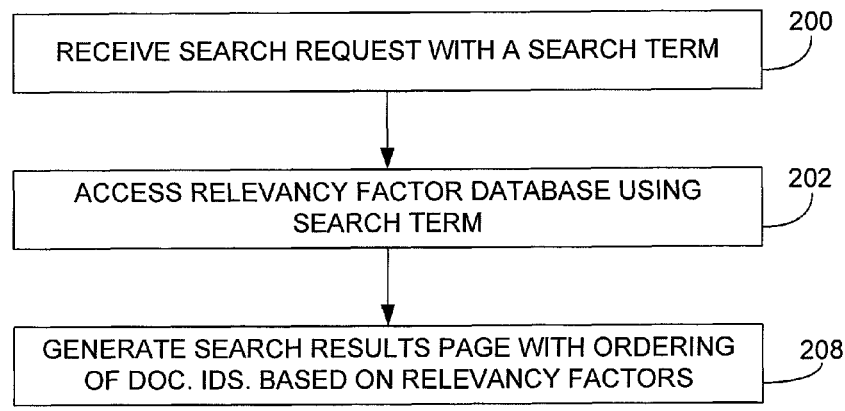
FIG. 4 illustrates a flowchart of the steps of one embodiment of a method for providing enhanced search results.

FIG. 4 illustrates a flowchart of the steps of one embodiment of a method for providing enhanced search results. In one embodiment, the method begins, step 200, by receiving a search request with a search term. As discussed above, this may be received in the processing device 102 of the system 100. The next step, step 202, is accessing a relevancy factor database using the search term. As discussed above, the relevancy factor database 106 includes relevancy factors relative to various search terms.

Figure 5:
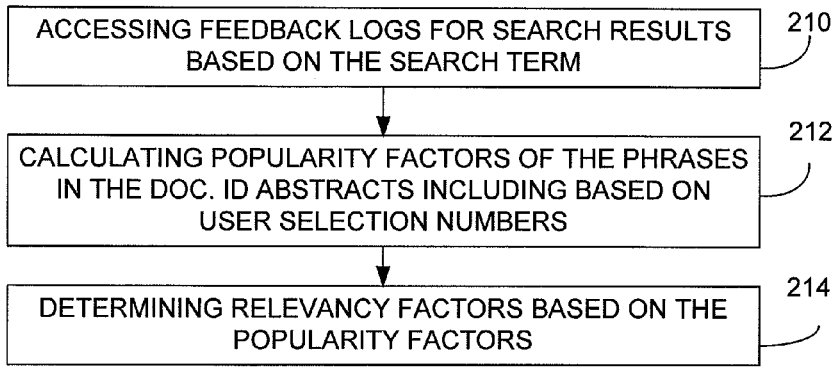
FIG. 5 illustrates a flowchart of the steps of one embodiment of the determination of relevancy factors within the method for providing enhanced search results.

The relevancy factor database may be pre-populated with relevancy factors, as generated in one embodiment in the steps of the flowchart of FIG. 5. In one embodiment, a first step, step 210, is accessing feedback logs for search results based on the search term. The feedback logs 138 include information based on previous user search sessions including tracking the user selection activities, as well as the abstracts with abstract terms that were presented to previous users.

With the feedback logs, a next step, step 212, is calculating popularity factors for the phrases in the document identifier abstracts, where this calculation takes into account the number of user selections of corresponding hyperlinks of the document identifiers. The phrases of the abstracts include all terms and contiguous combinations of terms.

In this embodiment, the next step, step 214, is determining the relevancy factors based on the popularity factors. The relevancy factors, as described above, may be determinative guidelines for enhancing search results where these guidelines provide an indication that certain document identifiers are more popular with previous user search result pages. Thereby, these relevancy factors may be stored in the relevancy factor database.

Referring back to flowchart of FIG. 4, the method may further therein include, step 208, generating a search results page with the ordering of document identifiers based on relevancy factors. As discussed above, this methodology thereby improves the sequence and hence the effectiveness of the search result by placing more popular search result document identifiers higher in the search results page for the requesting user.

As described herein, the determination of popularity factors is based on abstract terms and contiguous phrases of abstract terms. It is recognized that further enhancements can be recognized by further recognitions in the recognized terms and contiguous phrases.

Figure 6:
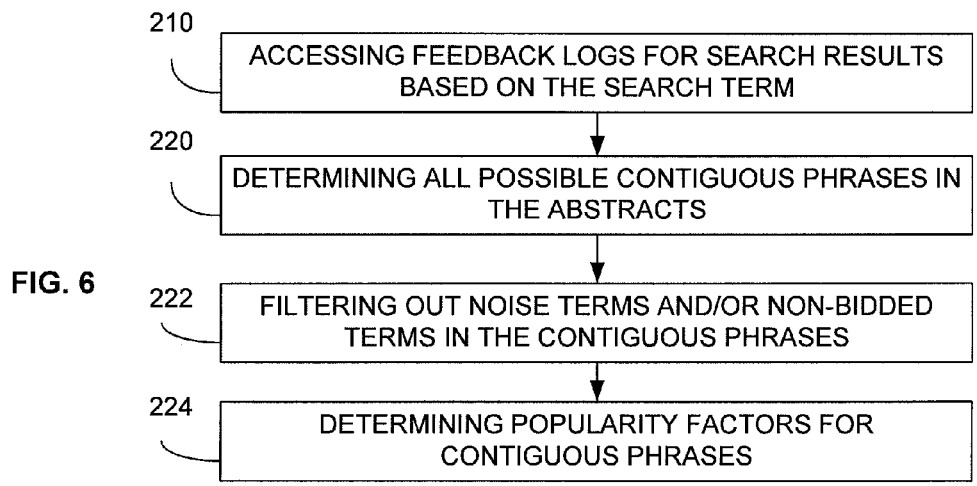
FIG. 6 illustrates a flowchart of the steps of another embodiment of the determination of relevancy factors within the method for providing enhanced search results.

For example, FIG. 6 illustrates a flowchart of a method for further enhancement of a search results page, including accessing feedback logs, step 210, same as step 210 of FIG. 5. A next step, step 220, is determining all possible contiguous phrases in the abstracts.

In addition to step 220, the method further includes the step of filtering out noise terms and/or non-bidded terms in the contiguous phrase, step 222. As used herein, noise terms refer to common terms that bear little benefit to a contiguous phrase and act as noise, such as the common terms of "a," "an," "the," "and," etc. These terms can make the sample of contiguous phrases, as described in the Equations above, larger and unnecessarily verbose. Therefore, by eliminating the noise terms, this improves the efficiency of the popularity factor determination and further improves the efficiency of generating a search results page because this also reduces the number of phrases associated with a search term. As used herein, non-bidded terms refer to terms that are not subject to bidding by various parties. A common example of a bidded term is in advertising, where a party bids on the rights to associate a document identifier with the corresponding term. A classic example may be a party bidding on the term "camera" for selling cameras at a commercial web site. When focusing on advertising revenue, the filtering of non-bidded terms thereby increases efficiency, also by reducing the pool of phrases used for initial relevancy factor computation as well as the number of phrases associated with a search term.

Thereupon, a next step, step 224 is to determine the popularity factors for contiguous phrases. In this embodiment, there may be a reduced number of contiguous phrases based on the filter operations of step 222.

Figure 7:
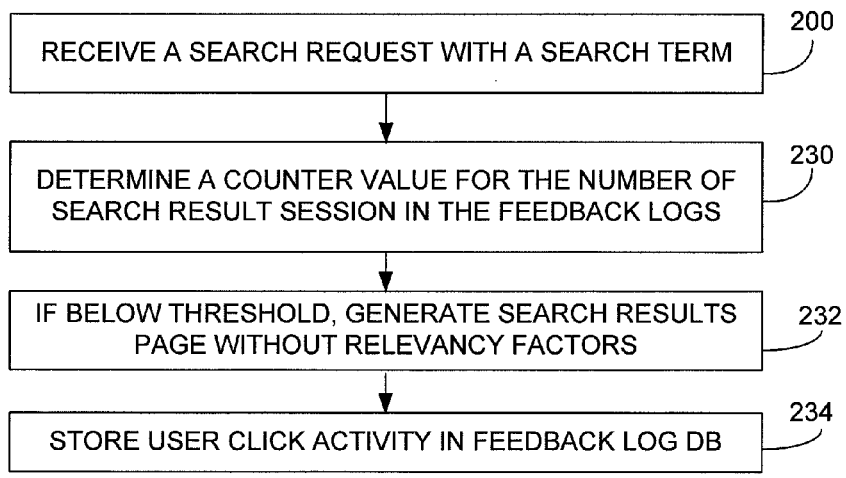
FIG. 7 illustrates a flowchart of the steps of another embodiment of a method for providing enhanced search results.

FIG. 7 illustrates another embodiment of enhancing search results. This methodology includes step 200 of receiving a search request with a search term. Upon receipt of the search term, the method includes determining a counter value for the number of search result sessions in the feedback logs, step 230.

In one embodiment, the feedback logs may include a counter value indicating the number of search sessions logged for a particular search term. The search session logs include the information for the search session including user selection activity. It may be determined that a minimum number of search term log entries for a particular search term are required for a reliable determination of relevancy factors. In a typical Internet-accessible search engine, it is not unreasonable to have a significantly large sample of user search sessions for a common search term in a relatively short period of time.

Therefore, in step 230, the processing device may examine the counter value. If the counter value is below a threshold, step 232, the processing device may generate the search results without using relevancy factors. In this case, the processing device may determine the relevancy factors to be unreliable as not having a large enough data sample set. Therefore, in this embodiment, the method further includes, step 234, tracking the user selection activity and storing the user click activity in the feedback logs. Whereupon, the feedback log may thereby increment the counter value.

Through the inclusion of relevancy factors associated with user selection activity and taking into account terms and/or phrases of document identifier abstracts, the method and system enhances search results. It is further recognized that the present system and method may be incorporated with other optimization or enhancement techniques for producing superior search result techniques.

FIGS. 1-7 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for providing enhanced search results in response to a search request having a search term, the search results including a plurality of document identifiers, each document identifier having a hyperlink and an abstract with a plurality of abstract terms, the method comprising:
   receiving a search query containing a plurality of terms;
   retrieving a plurality of document identifiers associated with the search query;
   retrieving a plurality of feedback logs associated with the search query terms, the feedback logs containing a plurality of past document identifiers previously presented to users and an indication of a user selections of the past document identifiers;
   identifying a plurality of contiguous phrases present in the abstract of a given past document identifier;
   filtering out a plurality of non-biddable phrases in the abstract;
   for each identified contiguous phrase, generating a popularity factor, the popularity factor based on the number of occurrences of the identified phrase in the feedback logs and the indication of a user selections of the past document identifiers;
   determining the relevancy factors based on the popularity factors; and
   generating a search results page in response to the search request for the search term where the ordering of the document identifiers is determined based on the relevancy factors.

2. The method of claim 1, wherein the determining of a plurality of contiguous phrases further includes: filtering out a plurality of noise terms in the abstracts.

3. The method of claim 1 wherein the contiguous phrase may include a single term.

4. The method of claim 1, wherein the feedback logs include a counter value indicating a number of search result sessions for the search term included therein, the method further comprising:
- prior to accessing the search results database, determining the counter value; and
- if the counter value is below a threshold value, generating the search results page without the relevancy factors.

5. The method of claim 4 wherein if the feedback log is below the threshold value, the method further comprising:
- tracking user click activity on the search results page; and
- storing the user click activity in the feedback logs.

* * * * *